United States Patent [19]

Barcelon et al.

[11] Patent Number: 4,820,544

[45] Date of Patent: Apr. 11, 1989

[54] UNIQUE FLAVOR COMPOSITION

[75] Inventors: Shirley A. Barcelon, Randolph; Mamoun M. Hussein, Mountain Lakes, both of N.J.; Leonard P. Abbazia, Brooklyn, N.Y.; Allan H. Graff, Randolph, N.J.

[73] Assignee: Warner-Lambert Company, Morris Plains, N.J.

[21] Appl. No.: 112,313

[22] Filed: Oct. 22, 1987

[51] Int. Cl.$^4$ .................................................. A23G 3/00
[52] U.S. Cl. .................................... 426/660; 426/650; 426/651
[58] Field of Search .............. 426/660, 538, 651, 534, 426/650

[56] References Cited

U.S. PATENT DOCUMENTS

| 4,154,867 | 5/1979 | Aldrich et al. | 426/660 |
| 4,452,825 | 6/1984 | Klacik et al. | 426/804 |
| 4,454,111 | 6/1984 | Boden et al. | 426/534 |
| 4,497,846 | 2/1985 | Boursier et al. | 426/804 |
| 4,528,206 | 7/1985 | Kastin | 426/804 |

OTHER PUBLICATIONS

Fenaroli's Handbook of Flavor Ingredients, Second Edition (1975), vol. 1, pp. 307–308, 328–330, 405–406, vol. 2, pp. 198 & 330.
Abstract No. 1262105, WPI Acc No: 77-18280 Y/11 for DE 2537762.
Abstract No. 1933708, WPI Acc No: 80-29130 C/16 for U.S. Pat. No. 4,197,328 et al.
Abstract No. 30988C/17 for U.S. Pat. No. 4,198,393.
Abstract No. 481494, WPI Acc No: 82-58927 E/28 for SU 863633.
Abstract No. 521750, WPI Acc No: 82-99204 E/46 for SU 897844.
Abstract No. 637438, WPI Acc No. 83-26964 K/11 for SU 926007.
Abstract No. 679842, WPI Acc No: 83-705590/27 for U.S. Pat. No. 4,389,421.
Abstract No. 84-005657/01 for U.S. Pat. No. 4,420,472.
Abstract No. 978216, WPI Acc No: 84-153373/25 for DE 3246069.
Abstract No. 84-164872/26 for U.S. Pat. No. 4,454,111.
Abstract No. 1366382, WPI Acc No: 85-182293/30 for SU 1030407.
Abstract No. 1402182, WPI Acc No: 85-218083/36 for U.S. Pat. No. 4,626,427.

*Primary Examiner*—R. B. Penland
*Attorney, Agent, or Firm*—Gary M. Nath; Henry C. Jeanette

[57] ABSTRACT

A hard boiled candy composition having a unique flavor perception is disclosed. The composition comprises a sugar or sugarless hard boiled candy base and the following flavoring agents: corn mint oil, eugenol (or clove oil), cardamom and menthol.

23 Claims, No Drawings

UNIQUE FLAVOR COMPOSITION

FIELD

This invention relates to a candy composition having a unique flavor perception resulting from a combination of different flavoring agents.

BACKGROUND

Flavoring agents, individually or in combination, are used to impart desired flavor characteristics to a variety of consumable products. Blends of flavoring agents can provide interesting and pleasing flavor perceptions through a balancing and/or merging of individual flavor notes. In such blends variations in the amount or kind of flavoring agent can result in completely different flavor perceptions by, for example, a shifting from a harmonious blending of flavor notes to an inharmonious cacophony of flavor perceptions. Combinations of flavoring agents that provide a unique, refreshing and clean flavor perception by a balancing and harmonious blending of flavor notes would always be a welcome contribution to the art. This invention provides just such a contribution.

SUMMARY OF THE INVENTION

This invention provides a hard boiled candy, of the sugar or sugarless variety, which has a unique flavor provided by the following flavoring agents: corn mint oil, menthol, clove oil, and cardamom.

In particular, this invention provides a hard boiled candy composition having a unique flavor perception comprising:

(A) An effective amount of a hard boiled candy base; and (B) An effective amount of a blend of flavoring agents comprising:

(i) corn mint oil in an amount of about 20 to about 94.9% by weight of said blend;

(ii) eugenol or clove oil in an amount of about 5 to about 40% by weight of said blend;

(iii) cardamom in an amount of about 0.1 to about 3.0% by weight of said blend; and (iv) menthol such that the total menthol content of said blend is about 40 to about 75% by weight of said blend; wherein the total amount of all components of said blend equals 100%, and the total amount of the components in the composition equals 100%.

DETAILED DESCRIPTION OF THE INVENTION

Sugar and sugarless hard boiled candy bases are well known in the art.

The hard boiled candy bases are usually prepared from a mixture of sugar and other carbohydrates that are kept in an amorphous or glassy condition. This form can be considered a solid syrup of sugars generally having up to about 4.5% moisture, based on the weight of the candy base, with about 0.5 to about 2.5% being preferred and about 1.0 to about 1.5% being most preferred. Such materials normally contain up to 65% corn syrup, up to 80% sugar and from 0.1% to 5.0% water. Generally, the ratio of sugar (or other sweetener suitable for candy formulation) to corn syrup is within the range of about 70:25 to about 45:55 with about 60:40 being preferred. The syrup component generally is prepared from corn syrups high in fructose, but may include other materials. Further ingredients such as flavorings, sweeteners, acidulents, colorants and so forth may also be added.

Hard boiled candy bases may also be prepared from non-fermentable sugars such as sorbitol, mannitol, xylitol, maltitol, hydrogenated starch hydrolysate, hydrogenated corn syrup and mixtures thereof. The candy bases may contain up to about 95% sorbitol, a mixture of sorbitol and mannitol at a ratio of about 9.5 to 0.5 up to about 7.5 to 2.5 and hydrogenated corn syrup up to about 55% of the syrup component.

A hydrogenated starch hydrolysate (HSH) candy base may contain up to about 98% by wt. HSH, or derivative thereof, in combination with a sugar alcohol. A sorbitol candy base can be produced from a sorbitol solution which is heated, cooled, and provided with a crystalline material for nucleation. The exact nature of the hard boiled candy base is not critical to the claimed invention. Further information about sugarless candy bases may be found, for example, in: U.S. Pat. Nos. 4,154,867 issued to Aldrich et al on May 15, 1979; 4,452,825 issued to Klacik et al on June 5, 1984; 4,497,846 issued to Boursier et al on Feb. 5, 1985; and U.S. 4,528,206 issued to Kastin on July 9, 1985; the disclosures of each being incorporated herein by reference thereto. Further information on high fructose hard candy may be found, for example in U.S. Pat. No. 4,311,722 issued to Vink et al on Jan. 19, 1982.

Effective amounts of the hard boiled candy base is utilized in order to provide the results desired for the ultimate end product. Usually, the amount of hard boiled candy base may be suitably varied to accommodate any additionally desired ingredients besides the flavoring agents. Generally, however, the candy base is present in amounts of about 94 to about 99.5% by wt. of the composition; with about 96 to about 98% being preferred.

The flavor blend utilized in this invention which provides a unique flavor perception to the consumer comprises corn mint oil, eugenol, cardamom and menthol. The term cardamom as used herein is meant to describe cardamom oil, cardamom oleoresin, or mixtures thereof. Although the amount of the blend used may vary in accordance with individual taste preference, the individual components are present within the blend in amounts effective to provide the unique flavor perception. Generally, the blend is present in amounts of about 0.1 to about 2% by weight of the composition with about 0.1 to about 0.5% by weight being preferred, and about 0.1 to about 0.2% by weight being most preferred.

Mentha arvensis oil, commonly known as corn mint oil, is used in amounts of about 20 to about 94.9% by weight of the blend with about 40 to about 75% by weight being preferred and about 40 to about 65% by weight being most preferred and about 55 to about 65% by weight being more preferred.

Either natural corn mint oil, partially dementholized corn mint oil or mixtures thereof can be used. By natural corn mint oil, it is meant the corn mint oil as obtained from the mentha arvensis plant. Natural corn mint oil can contain menthol in amounts of as much as about 80% by weight of the oil with about 70% to about 80% being more usual. Partially dementholized corn mint oil generally contains menthol in amounts of about 35 to about 60% by weight of the oil. In terms of convenience and commercial availability, it is preferred to use partially dementholized corn mint oil.

The blend contains a menthol component such that the total amount of menthol in the blend is about 40 to about 75% by weight of the blend with about 40 to about 5% being preferred and about 45 to about 55% being most preferred and about 45 to about 52% being more preferred. This menthol content may be from the corn mint oil alone or may result from added menthol in addition to the menthol contribution of the corn mint oil. Since the corn mint oil has a known or readily determined menthol content, it is well within the capabilities of those skilled in the art, without the need for undue experimentation, to determine the amount of menthol which may additionally be added to the blend in order to bring the menthol content of the blend within the above described amounts. For example, in a blend containing about 60 wt. % partially dementholized corn mint oil menthol would be added in amounts of about 19% to about 39% by weight of the blend.

Eugenol is added to the blend in amounts of about 5 to about 40% by weight of the blend with about 10 to about 30% by weight being preferred and about 10 to about 20% being most preferred and about 12 to about 17% being more preferred. A common source of eugenol is clove oil, and as such clove oil can be used in place of eugenol in the compositions of this invention. Clove oil is a well known essential oil which is available as clove bud oil, clove leaf oil and clove stem oil depending on the part of the plant the oil is extracted from. Thus, the term clove oil used herein is meant to describe clove bud oil, clove leaf oil, clove stem oil, clove oleoresins or mixtures thereof. Water distilled clove bud oil has a very high content of total eugenol, usually over 92%, but a substantial part (about 10–15%) of this is aceteugenol. Clove leaf oil contains about 82 to about 90% eugenol and clove stem oil contains about 87 to about 96% eugenol. Additional information on clove oil may be found in Arctander, Steffen, *Perfume and Flavor Materials of Natural Origin,* Elizabeth, N.J., 1960, Column Numbers 179–185; and in Lawrence, Dr. Brian M. (Editor), *Essential Oils* 1976–1977, Allured Publishing Corporation, Wheaton, Ill., pages 106–109; the disclosures of each being incorporated herein by reference thereto.

Cardamom is used in amounts of about 0.1 to 3.0% by weight of the blend with about 0.2 to about 1.5% by weight being preferred and about 0.3 to about 1.0% being most preferred and about 0.3 to about 0.7 being more preferred. Preferably cardamom oil is used. Cardamom oil is a well known essential oil whose main constituents are cineole, terpinylacetate, terpineol, borneal and terpenes. More information on cardamom oil may be found in Arctander, Steffen, *Perfume and Flavor Materials of Natural Origin,* Elizabeth, N.J., 1960, Column Numbers 126 to 128.

Those skilled in the art will appreciate that the description of the above flavoring agents and essential oils is also meant to encompass chemicals and chemical blends designed to mimic, take the place of, or impart substantially the same flavor notes, virtues and perceptions as the aforementioned flavoring agents, components, and essential oils.

The hard boiled candy bases, as stated above, contain a sweetener which is a sugar or sugarless sweetener or mixtures thereof. Other sweetening agents (sweeteners) which may prove useful may be selected from amongst water-soluble sweetening agents, water-soluble artificial sweeteners, water-soluble sweetening agents derived from naturally occurring water-soluble sweeteners, dipeptide based sweeteners, and protein based sweeteners, including mixtures thereof. Without being limited to particular sweeteners, representative illustrations encompass:

A. Water-soluble sweetening agents such as monosaccharides, disaccharides and polysaccharides such as xylose, ribose, glucose (dextrose), mannose, galactose, fructose (levulose), sucrose (sugar), maltose invert sugar (a mixture of fructose and glucose derived from sucrose), partially hydrolyzed starch, corn syrup solids, dihydrochalcones, monellin, steviosides, glycyrrhizin, and sugar alcohols such as sorbitol, xylitol, mannitol, maltitol, hydrogenated starch hydrolysate and mixtures thereof;

B. Water-soluble artificial sweeteners such as the soluble saccharin salts, i.e., sodium or calcium saccharin salts, cyclamate salts, acesulfame-K and the like and the free acid form of saccharin;

C. Dipeptide based sweeteners such as L-aspartyl-L-phenylalanine methyl ester and materials described in U.S. Pat. No. 3,492,131, L-$\alpha$-aspartyl-N-(2,2,4,4-tetramethyl-3-thietanyl)-D-alaninamide hydrate, and the like;

D. Water-soluble sweeteners derived from naturally occurring water-soluble sweeteners, such as a chlorinated derivative of ordinary sugar (sucrose), known, for example, under the product designation of sucralose; and E. Protein based sweeteners such as thaumatin.

In general, the amount of any of these other sweeteners which may be used can vary in accordance with the sweetener selected and its use as either a candy base forming material or to compliment the candy base forming sweetener. Sweeteners used to compliment the base forming material may be used in amounts of about 0.005% by weight to about 5.0% by weight of the candy base with about 0.01 to about 5% by weight being preferred and about 0.05% by weight to about 2.5% by weight being most preferred.

Colorants (coloring agents or colors) may be added in amounts which are effective to provide the desired coloration of the final product. Colorants can generally be used in amounts of about 0.005 to about 2 wt. % based on the weight of the composition with about 0.005 to about 0.1 wt. % being preferred and about 0.01 to about 0.08 being most preferred.

The colorants may include natural and synthetic dyes suitable for food, drug and cosmetic applications, such as chlorophyll, caramel, beet juice, beta carotenes, and the like, and those dyes known as F.D. & C. dyes and lakes. The materials acceptable for the foregoing spectrum of use are preferably water-soluble, and include indigoid dye, known as F.D. & C. Blue No. 2, which is the disodium salt of 5, 5-indigotindisulfonic acid. Similarly, the dye known as F.D. & C. Green No. 1 comprises a triphenylmethane dye and is the monosodium salt of 4-[4-N-ethyl-p-sulfobenzylamino) diphenylmethylene]-[1-N-ethyl-N-p-sulfoniumbenzyl)- $\Delta^{2,5}$ -cyclohexadienimine]. A full recitation of all F.D. & C. and D. & C. dyes and their corresponding chemical structures may be found in the Kirk-Othmer Encyclopedia of Chemical Technology, at Volume 5, Pages 857–884, which text is accordingly incorporated herein by reference.

The compositions of this invention may be prepared using a batch or continuous process by adding the flavoring agents individually or together in a blend to the hard boiled candy base after the base has been heated, as described below. In view, however, of the process of making hard boiled candies, it is more convenient to first mix the flavoring agents together to form a blend and then add the blend to the hard boiled candy base. The hard boiled candy base components are heated together to a temperature which allows thorough mixing of the ingredients, reduction of moisture content, and from which cooling produces a solidified hard boiled candy without adversely degrading the components. For example, the hard boiled candy may be obtained by heating the base components to a temperature within the range of about 240° F. to about 335° F. with about 250° to about 310° F. being preferred. The preferred temperature ranges will depend on the type of components being heated, e.g., sugar and corn syrup, or sorbitol, or hydrogenated starch hydrolysate, and such temperatures and procedures are well known in the art. While the hard boiled candy base is in a fluid and molten state, but at a temperature which will not volatilize or which will minimize any volatilization of the most volatile flavor component, the blend of flavoring agents is added to the hard boiled candy base and rapidly blended in. The rapid blending in of the flavoring agents is generally accomplished by folding the candy base over the added blend or by any other known process. Since the blend is a liquid, folding the candy base over the added blend allows for a rapid entrapment of the components of the blend in the candy base. Such rapid blending minimizes any loss of flavoring agents due to volatilization. Generally, the blend of flavoring agents is added to the hard boiled candy base when the base has cooled to a temperature of about 170° to about 180° F. The base with the added blend and any optional ingredients added concurrently with or subsequent to the blend, such as colorants, is then cooled and kneaded and formed into the desired shape. The formation of the hard boiled candy is carried out on conventional equipment.

Those skilled in the art will appreciate that the total amount of all ingredients (components) used in the hard boiled candy compositions of this invention equals 100% by weight of the total composition, and that the total of all the components of the flavor blend equals 100% by weight of the blend.

The following examples are illustrative only and should not be construed as limiting the invention in any way. Those skilled in the art will appreciate that variations are possible which are within the spirit and scope of the appended claims.

In the examples that follow a commercially available dementholized corn mint oil was utilized. The menthol content of the dementholized corn mint oil was about 38% by weight.

EXAMPLE 1

A hard boiled candy composition of this invention was prepared from the formulation set forth in Table 1.

TABLE 1

| Ingredient | % By Wt. of Composition |
| --- | --- |
| Candy Base* | 95.894 |
| Corn Mint Oil | 0.0595 |
| Clove Oil | 0.015 |
| Cardamom Oil FCC Select | 0.0005 |
| Menthol Crystals USP | 0.025 |
| Color | 0.010 |
| Residual Moisture | 3.996 |

TABLE 1-continued

| *Candy Base | % By Wt. of Base |
| --- | --- |
| Sugar | 57.485 |
| Corn Syrup 42De, 43Be | 38.465 |
| Water (Residual) | 4.000 |
| Color | 0.050 |

The components of the candy base were cooked together at 140° C. for about 18 to about 20 minutes until all components were thoroughly blended. The flavoring agents were then blended in and the candy mass was poured onto a slab, kneaded and cooled. The candy mass, at 77° C., was shaped using drop rollers. The candy shapes so formed had a diameter of about 0.75 inches and a thickness of about 0.275 inches.

The hard boiled candy produced had a pleasing, satisfying, refreshing and unique flavor perception.

EXAMPLE 2

A hard boiled candy composition of this invention was prepared from the formulation set forth in Table 2.

TABLE 2

| Ingredient | % By Wt. of Composition |
| --- | --- |
| Candy Base* | 97.893 |
| Flavor Blend** | 0.130 |
| Color | 0.058 |
| Residual Moisture | 1.919 |

| *Candy Base | % By Wt. of Base |
| --- | --- |
| Sugar | 58.8 |
| Corn Syrup 42De, 43Be | 39.2 |
| Residue Moisture | 2.0 |

| **Flavor Blend | % By Wt. of Blend |
| --- | --- |
| Corn Mint Oil | 59.5 |
| Clove Oil | 15.0 |
| Cardamom Oil FCC Select | 0.5 |
| Menthol Crystals USP | 25.0 |

The candy base ingredients were cooked together to 285° F., 15 inch vacuum, for 5 minutes. The flavor and color were added to the base, and the candy mass was poured onto a slab, cooled, kneaded and shaped. The candy shapes so formed had a diameter of 0.75 inches and a thickness of about 0.275 inches.

The hard boiled candy produced had a pleasing, satisfying, refreshing, and unique flavor perception.

The invention thus being described, it will be obvious that the same may be varied in many ways. Such variations are not to be regarded as a departure from the spirit and scope of the invention and all such modifications are intended to be included within the scope of the claims.

What is claimed is:

1. A hard boiled candy composition having a unique flavor perception comprising:
   (A) An effective amount of a hard boiled candy base; and
   (B) An effective amount of a blend of flavoring agents comprising:
      (i) corn mint oil in an amount of about 20 to about 94.9% by weight of said blend;
      (ii) eugenol in an amount of about 5 to about 40% by weight of said blend;
      (iii) cardamom in an amount of about 0.1 to about 3.0% by weight of said blend; and (iv) menthol such that the total menthol content of said blend is about 40 to about 75% by weight of said blend;

wherein the total amount of the components of the blend equals 100%, and the total amount of the components in the composition equals 100%.

2. The composition of claim 1 wherein said blend is present in amounts of about 0.1 to about 0.3% by weight of said composition.

3. The composition of claim 1 wherein said candy base is present in amounts of about 94 to about 98% by weight of said composition.

4. The composition of claim 1 wherein said candy base is sugarless.

5. The composition of claim 1 wherein said candy base comprises sugar.

6. The composition of claim 1 wherein said corn mint oil is dementholized corn mint oil.

7. The composition of claim 1 wherein clove oil replaces said eugenol.

8. The composition of claim 1 wherein said cardamom is cardamom oil.

9. The composition of claim 1 wherein:
(i) said corn mint oil is present in an amount of about 40 to about 75% by weight of said blend;
(ii) said eugenol is present in an amount of about 10 to about 30% by weight of said blend;
(iii) said cardamom is present in an amount of about 0.2 to about 1.5% by weight of said blend; and
(iv) said menthol is present in an amount of about 40 to about 65% by weight of said blend.

10. The composition of claim 9 wherein clove oil replaces said eugenol.

11. The composition of claim 10 wherein the corn mint oil is dementholized corn mint oil.

12. A hard boiled candy composition having a unique flavor perception comprising:
(A) A hard boiled candy base in amounts of about 94 to about 98% by weight of said composition;
(B) at least about 0.1%, by weight of said composition, of a blend of flavoring agents comprising:
(i) corn mint oil in an amount of about 20 to about 94.9% by weight of said blend;
(ii) eugenol in an amount of about 5 to about 40% by weight of said blend;
(iii) cardamom in an amount of about 0.1 to about 3.0% by weight of said blend; and
(iv) menthol such that the total menthol content of said blend is about 40 to about 65% by weight of said blend;

wherein the total amount of the components of the blend equals 100%, and the total amount of the components in the composition equals 100%.

13. The composition of claim 12 wherein said corn mint oil is dementholized corn mint oil.

14. The composition of claim 13 wherein clove oil replaces eugenol.

15. The composition of claim 12 wherein clove oil replaces eugenol.

16. The composition of claim 12 wherein said blend is present in amounts of about 0.1 to about 0.3% by weight of said composition.

17. The composition of claim 12 wherein:
(i) said corn mint oil is present in an amount of about 40 to about 75% by weight of said blend;
(ii) said eugenol is present in an amount of about 10 to about 30% by weight of said blend;
(iii) said cardamom is present in an amount of about 0.2 to about 1.5% by weight of said blend; and
(iv) said menthol is present in an amount of about 40 to about 65% by weight of said blend.

18. The composition of claim 17 wherein said corn mint oil is dementholized corn mint oil.

19. The composition of claim 18 wherein clove oil replaces eugenol.

20. The composition of claim 19 wherein said blend is present in amounts of about 0.1 to about 0.3% by weight.

21. The composition of claim 20 wherein:
(i) said corn mint oil is present in an amount of about 55 to about 65% by weight of said blend;
(ii) said eugenol is present in an amount of about 12 to about 17% by weight of said blend;
(iii) said cardamom is present in an amount of about 0.3 to about 0.7 by weight of said blend; and
(iv) said menthol is present in an amount of about 45 to about 55% by weight of said blend.

22. The composition of claim 19 wherein the cardamom is cardamom oil.

23. The composition of claim 12 wherein said cardamom is cardamom oil.

* * * * *